US012110144B2

(12) United States Patent
Centorame et al.

(10) Patent No.: US 12,110,144 B2
(45) Date of Patent: Oct. 8, 2024

(54) DOSING APPARATUS, AND MACHINE AND METHOD FOR PRODUCING UNIT DOSE ARTICLES

(71) Applicant: Fameccanica.Data S.p.A., San Giovanni Teatino (IT)

(72) Inventors: Oscar Centorame, San Giovanni Teatino (IT); Diego Gualtieri, San Giovanni Teatino (IT)

(73) Assignee: Fameccanica.Data S.p.A., San Giovanni Teatino Chieti (IT)

( * ) Notice: Subject to any disclaimer, the term of this patent is extended or adjusted under 35 U.S.C. 154(b) by 0 days.

(21) Appl. No.: 17/722,695

(22) Filed: Apr. 18, 2022

(65) Prior Publication Data

US 2022/0332452 A1 Oct. 20, 2022

(30) Foreign Application Priority Data

Apr. 19, 2021 (EP) .................................... 21169203

(51) Int. Cl.

*B65B 39/12* (2006.01)
*B65B 3/02* (2006.01)
*B65B 3/04* (2006.01)
*B65B 9/04* (2006.01)
*B65B 37/00* (2006.01)

(Continued)

(52) U.S. Cl.

CPC .............. *B65B 39/12* (2013.01); *B65B 3/022* (2013.01); *B65B 3/04* (2013.01); *B65B 9/042* (2013.01); *B65B 37/00* (2013.01); *B65B 47/10* (2013.01); *B65B 57/00* (2013.01); *B65B 61/06* (2013.01); *B65B 2009/047* (2013.01); *C11D 17/045* (2013.01)

(58) Field of Classification Search

CPC ........... B65B 39/12; B65B 3/022; B65B 3/04; B65B 9/042; B65B 37/00; B65B 47/10; B65B 57/00; B65B 61/06; B65B 2009/047; B65B 39/14; B65B 39/145; B65B 47/02; B65B 3/02; B65B 3/26

See application file for complete search history.

(56) References Cited

U.S. PATENT DOCUMENTS 3,336,956 A * 8/1967 Thorn ........................ B65B 3/10
141/144
4,571,924 A * 2/1986 Bahrani .................. B65B 9/042
53/579

(Continued)

FOREIGN PATENT DOCUMENTS

DE 10246061 A1 4/2004
GB 2520306 A 5/2015

OTHER PUBLICATIONS

European Search Report dated Sep. 14, 2021. 4 pages.

*Primary Examiner* — Thomas M Wittenschlaeger
*Assistant Examiner* — Katie L Gerth
(74) *Attorney, Agent, or Firm* — RMCK Law Group PLC

(57) ABSTRACT

A dosing apparatus for a machine for producing unit dose articles including first and second dosing units each having: a nozzle support body carrying a plurality of nozzles, and a movement control unit configured for moving the respective nozzle support body along a closed-loop path, wherein the movement control units of the first and second dosing units are configured for moving the respective nozzle support bodies independently of each other along the closed-loop path.

12 Claims, 8 Drawing Sheets

(51) Int. Cl.

*B65B 47/10* (2006.01)
*B65B 57/00* (2006.01)
*B65B 61/06* (2006.01)
*C11D 17/04* (2006.01)

(56) References Cited

U.S. PATENT DOCUMENTS 4,999,978 A * 3/1991 Kohlbach ............. B65B 55/022 53/88
5,971,041 A * 10/1999 Drewitz .................... B67C 3/04 141/180
9,862,585 B2 * 1/2018 Ramnarain ............. B65B 43/52
10,273,027 B2 * 4/2019 Kepinski ................... B65B 1/02
2009/0199877 A1 * 8/2009 Koch ................... C11D 17/045 134/42
2011/0016834 A1 * 1/2011 Rapparini ............. B65B 29/025 53/510
2012/0235329 A1 * 9/2012 Fowler .................... B65B 47/10 425/388
2014/0235522 A1 * 8/2014 Wiedemann ....... C11D 17/0039 510/220
2015/0034207 A1 * 2/2015 Boira Bonhora ......... A61J 1/05 141/83
2015/0336692 A1 * 11/2015 Brandt Sanz ........ C11D 17/042 53/450
2016/0068285 A1 * 3/2016 Fowler ................... B65D 65/46 53/558
2016/0114914 A1 * 4/2016 Kepinski ................... B65B 1/02 53/436
2016/0340068 A1 * 11/2016 Brandt Sanz ............. B65B 1/02
2017/0088298 A1 * 3/2017 McLenithan ........... B65B 47/02
2017/0341919 A1 * 11/2017 Ramnarain ............... B65B 3/12
2018/0290774 A1 * 10/2018 Fowler .................... B65B 9/042
2019/0248527 A1 * 8/2019 Kepinski ................... B65B 1/12
2020/0079534 A1 * 3/2020 Conti ........................ B65B 3/04
2021/0163160 A1 * 6/2021 Bood ...................... B65B 61/08

* cited by examiner

DOSING APPARATUS, AND MACHINE AND METHOD FOR PRODUCING UNIT DOSE ARTICLES

CROSS-REFERENCE TO RELATED APPLICATION

This application claims priority to European Patent Application No. 21169203.3 filed Apr. 19, 2021. The disclosure of the above application is incorporated herein by reference in its entirety.

FIELD OF THE INVENTION

The present invention relates to a dosing apparatus for dosing a fluid product.

The invention was developed in particular in view of its application to the production of unit dose articles, e.g., unit dose articles filled with household care compositions, such as laundry detergents, dishwasher detergents, softeners, and other compositions used in household appliances.

The invention relates also to a machine and method for producing unit dose articles, in particular detergent pods formed by a one or more fluid compositions enclosed between two water-soluble films.

In the following description, reference will be made to this specific field without however losing generality.

PRIOR ART

Laundry and dishwasher detergent pods are water-soluble pouches containing highly concentrated laundry detergents, softeners, and other laundry products. Detergent pods are becoming increasingly popular in view of the ease of use for the user and the positive impact on sustainability as they are a way to reduce wasted use of powdered and liquid detergent by having precise measurements for a load.

Detergent pods are generally produced by forming recesses in a first water-soluble film, filling the recesses with fluid compositions, applying a second water-soluble film over the first water-soluble film, and joining to each other the first and second water-soluble films so as to seal the compositions between the two water-soluble films.

WO2015179584-A1 discloses methods and systems for dispensing a composition into the cavities of a web that continuously moves in a machine direction, wherein a water-soluble web having a plurality of cavities is disposed on a continuously moveable surface, wherein a filling apparatus comprising a plurality of nozzles is positioned to dispense a household care composition into the cavities while said nozzles move from a first position to a second position, and wherein said nozzles return to said first position after having filled the respective cavities.

An alternate reciprocating dispensing process, where one or more nozzles move together with the cavities to be filled and return to a start position after having filled the cavities, improves efficiency as compared to a start and stop filling process, where the cavities stop under a nozzle while being filled. However, after the nozzles fill one set of cavities, the nozzles must return to the start position before they begin filling the next set of cavities. This may limit the speed of the filling process and the number of cavities that can be filled in a given time period.

Another problem of the prior art is the so called "splashing" which may occurs when the fluid compositions are dispensed in the cavities too quickly and the fluid splashes out of the cavities. On one hand it is desirable to fill the cavities as quickly as possible to improve efficiency, but high a dispensing speed increases the risk that the fluid compositions splash out of the cavities, which may lead to poor sealing of the water-soluble films and increased risk of leakage.

Splashing depends on many factors, such as the speed of the dispensed fluid, the viscosity of the fluid and the distance between the nozzles and the walls of the cavities. The risk of splashing increases with the dispensing speed, with low viscosity fluids and with the distance between the nozzles and the cavities. In many cases it is necessary to slow the rate of filling in order to avoid splashing. Also, manual adjustments are often necessary when the type of the dispensed fluid is changed.

OBJECT AND SUMMARY OF THE INVENTION

The object of the present invention is to provide a dosing unit which overcomes one or more of the problems of the prior art.

According to the present invention, this object is achieved by a dosing unit according to claim 1.

According to another aspect, the present invention relates to a machine and method for manufacturing unit dose articles according to claims 8 and 12.

The claims form an integral part of the technical disclosure provided here in relation to the invention.

BRIEF DESCRIPTION OF THE DRAWINGS

The present invention will now be described in detail with reference to the attached drawings, given purely by way of non-limiting example, wherein.

It should be appreciated that the attached drawings are schematic and various figures may not be represented in the same scale. Also, in various figures some elements may not be shown to better show other elements.

DETAILED DESCRIPTION

Figure 1:
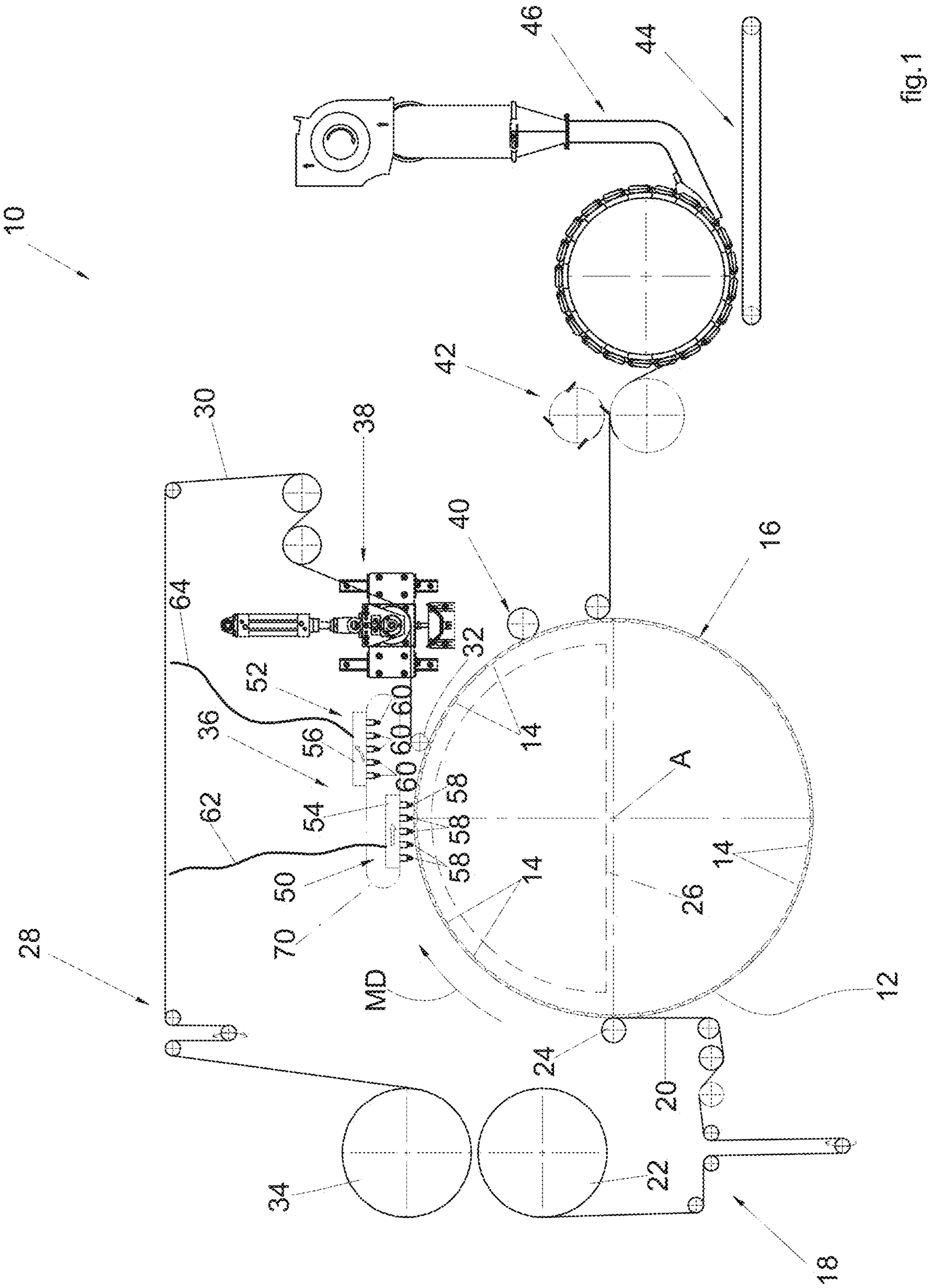
FIG. 1 is a schematic side view of a machine for producing unit dose articles according to the present invention.

With reference to FIG. 1, a machine for producing unit dose articles is indicated by the reference numeral 10.

The machine 10 comprises a forming surface 12 having a plurality of cavities 14, continuously movable in a machine direction MD. In the embodiment shown in FIG. 1 the forming surface 12 is the outer cylindrical surface of a drum 16 rotating about a horizontal axis A. In a possible embodiment, the forming surface 12 may be the outer surface of a closed-loop belt having a horizontal upper section and a lower return section.

The machine 10 comprises a first feeding assembly 18 configured for feeding a first continuous water-soluble film 20 on the forming surface 12. The first continuous water-soluble film 20 is unwound from a first reel 22 and is supplied to the forming surface 12 at a first position 24.

The first continuous water-soluble film 20 is retained on the forming surface 12 as it moves in the machine direction MD. The first continuous water-soluble film 20 may be retained on the forming surface 12 by mechanical retention elements acting on lateral edges of the first continuous water-soluble film 20, e.g. by belts which retain the lateral edges of the first continuous water-soluble film 20 on the outer surface of the drum 16.

The first continuous water-soluble film 20 is deformed into the cavities 14 of the forming surface 12 as it moves in the machine direction MD. The deformation of the first continuous water-soluble film 20 into the cavities 14 may be obtained by a suction system comprising a plurality of holes open on the surfaces of the cavities 14 and fluidically connected to a stationary suction chamber 26 connected to a sub-atmospheric pressure source. The first continuous water-soluble film 20 is kept adherent to the walls of the cavities 14 by said suction system, so that in the first continuous water-soluble film 20 a plurality of recesses are formed, having the same shape as the cavities 14.

The machine 10 comprises a second feeding assembly 28 configured for feeding a second continuous water-soluble film 30 on the forming surface 12 at a second position 32 located downstream of said first position 24 with respect to the machine direction MD. The second continuous water-soluble film 30 is unwound from a second reel 34.

The machine 10 comprises a dosing apparatus 36 configured for dispensing dosed quantities of at least one fluid composition into the recesses of the first continuous water-soluble film 20, which are set at the cavities 14 of the forming surface 12. The dosing apparatus 36 is located in a position intermediate between the first position 24 and the second position 32. The dosing apparatus 36 fills the recesses of the first continuous water-soluble film 20 with one or more fluid compositions. After the recesses of the first continuous water-soluble film 20 have been filled with the fluid compositions, the second continuous water-soluble film 30 is applied over the first continuous water-soluble film 20, so as to enclose the dosed quantities of fluid compositions contained into the recesses between the first and second continuous water-soluble films 20, 30.

The machine 10 comprises a wetting unit 38 configured for wetting a surface of the second continuous water-soluble film 30 upstream of said second position 32. The wetting unit 38 comprises a wetting roller which is in contact with the surface of the second continuous water-soluble film 30 which will be put in contact with the first continuous water-soluble film 20. The first and second continuous water-soluble films 20, 30 are water-sealed to each other in respective contact areas which surround the recesses containing the dosed fluid compositions.

The machine 10 comprises a longitudinal cutter 40 and a transverse cutter 42 which cut the first and second continuous water-soluble films 20, 30 so as to form individual unit dose articles which are collected on an output conveyor 44. The scraps of the water-soluble films originated by the longitudinal and transverse cuts are removed by a scrap aspirator 46.

The dosing apparatus 36 comprises a first dosing unit 50 and a second dosing unit 52 independent of each other. The dosing units 50, 52 comprise respectively a first nozzle support body and a second nozzle support body 56, which are movable independently of each other. Each nozzle support body 54, 56 carries a plurality of nozzles 58, 60 connected to respective fluid delivery systems via respective flexible tubes 62, 64. The nozzles 58, 60 have respective fluid delivery apertures facing downwardly.

With reference to FIGS. 2-6, the dosing units 50, 52 comprise respective movement control units 66, 68, each of which is configured for moving the respective nozzle support body 54, 56 along a closed-loop path 70. The closed-loop path 70 has a lower delivery section 72 extending in the machine direction MD and an upper return section 74.

The two nozzle support bodies 54, 56 move independently of each other along the same closed-loop path 70. The orientation of the nozzles 58, 60 remains constant during the movement of the nozzle support bodies 54, 56 along the closed-loop path 70. The fluid delivery apertures of the nozzles 58, 60 may be oriented in a vertical direction or in an inclined direction oriented downwardly.

The movement control units 66, 68 may adjust the vertical position which the fluid delivery apertures of the nozzles 58, 60 have during the movement of the nozzle support bodies 54, 56 along the closed-loop path 70, so as to adjust the distance between the fluid delivery apertures and the walls of the cavities 14. The adjustment of the vertical position of the fluid delivery apertures of the nozzles 58, 60 may be carried out when the type of fluid to be dispensed is changed, so as to adapt the distance between the fluid delivery apertures and the walls of the cavities 14 to the viscosity of the fluid. This adjustment is highly effective for eliminating splashing and can be carried out via software by the movement control units 66, 68, without the need of manual interventions.

The two movement control units 66, 68 are located on opposite sides of a median vertical plane of the forming surface 12 and carry in cantilever fashion the respective nozzle support bodies 54, 56.

FIGS. 2-6 show three possible embodiments of the movement control units 66, 68. The embodiments shown in FIGS. 2-6 represent only non-limiting examples and many other design options are readily available for a skilled person.

Figure 2:
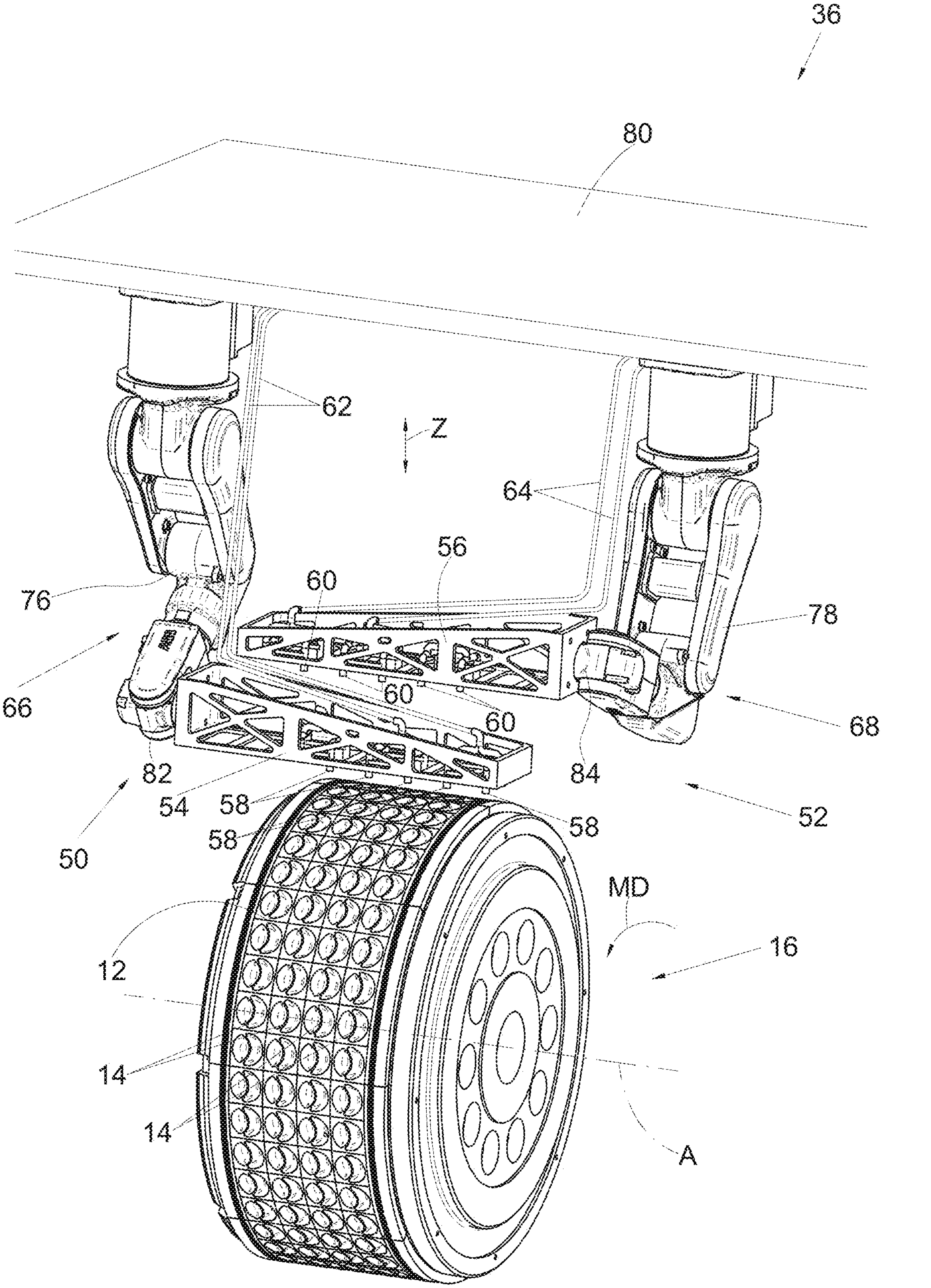
FIGS. 2 and 3 are a perspective view and a front view of a first embodiment of a dosing apparatus of the machine according to the present invention.
Figure 3:
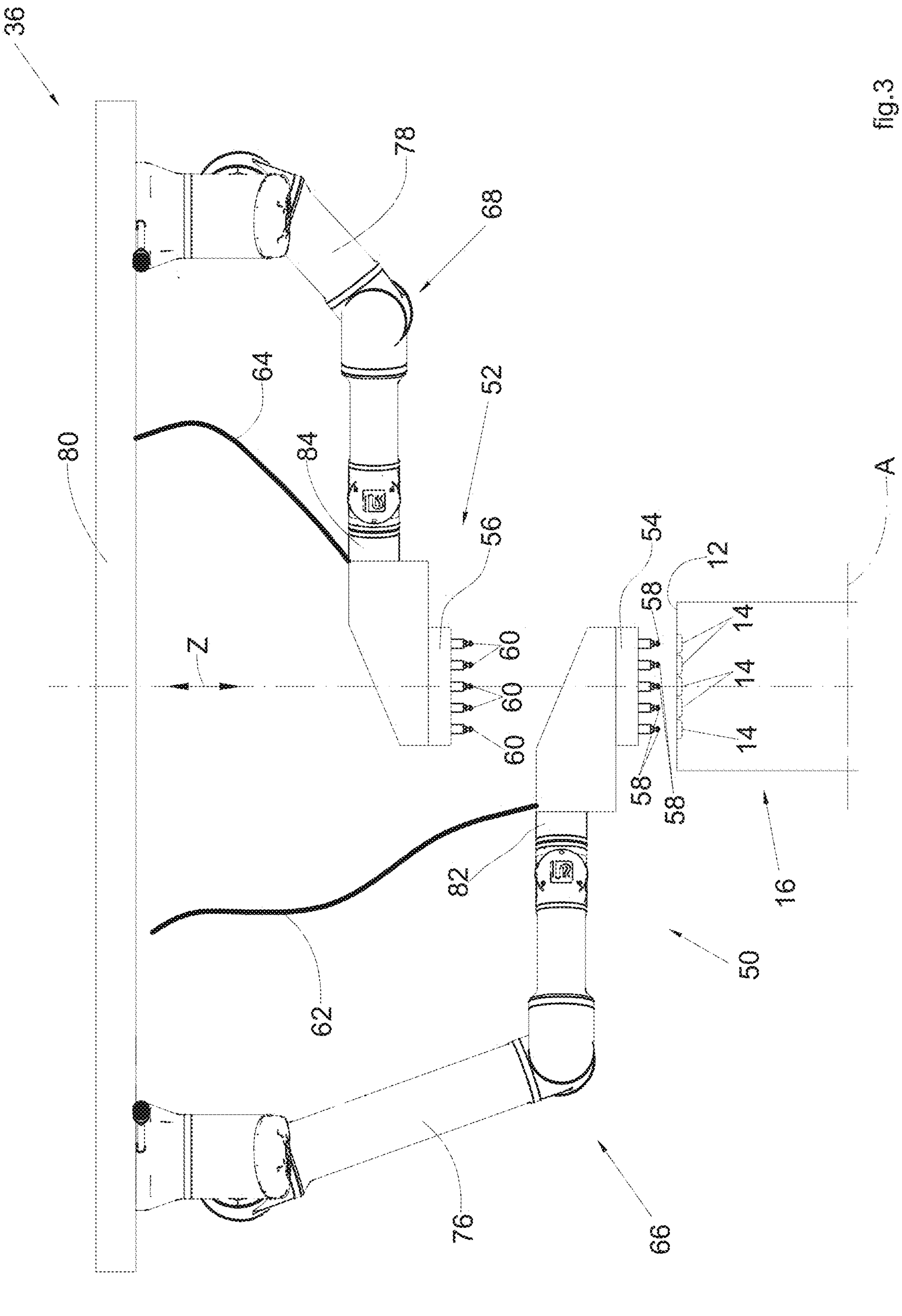

With reference to FIGS. 2 and 3 in a possible embodiment the movement control units 66, 68 comprise respective robotic arms 76, 78 having respective bases fixed to a stationary support and respective terminal elements 82, 84 connected to respective nozzle support bodies 54, 56 and movable in at least two orthogonal directions, i.e. in the machine direction MD and in a vertical direction Z.

The robotic arms 76, 78 are programmed to move the respective nozzle support bodies 54, 56 along the closed-loop path 70 in phase with the movement of the forming surface 12 in the machine direction MD, so that the nozzles 58, 60 are facing respective cavities 14 during the movement along the lower delivery section 72 of the closed-loop path 70. The nozzles 58, 60 are supplied with pressurized fluid during the movement along the lower delivery section 72. The supply of pressurized fluid stops when the nozzles 58, 60 reach the end of the lower delivery section 72 of the closed-loop path 70.

The robotic arms 76, 78 may adjust the vertical position which the nozzles 58, 60 have when they travel along the lower delivery section 72 depending on the type of fluid delivered. The robotic arms 76, 78 may also automatically move the nozzle support bodies 54, 56 to a purge area for purging the nozzles 58, 60 when the delivered fluid must be changed. All the set-up operations necessary when changing the delivered fluid (e.g. purging and vertical adjustment of the nozzles) may be carried out automatically.

Figure 4:
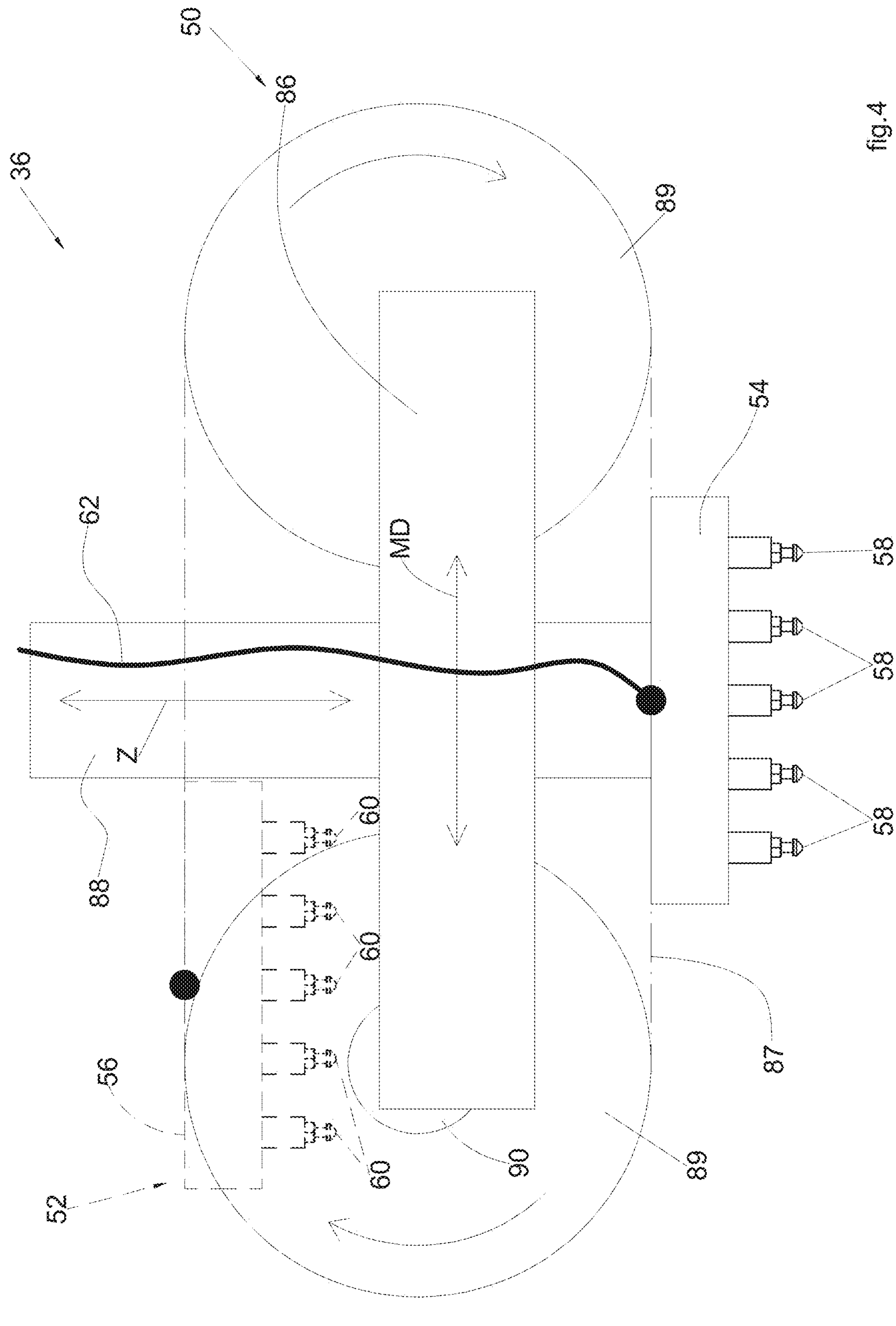
FIGS. 4 and 5 are side views of a second embodiment of a dosing apparatus of the machine according to the present invention.
Figure 5:
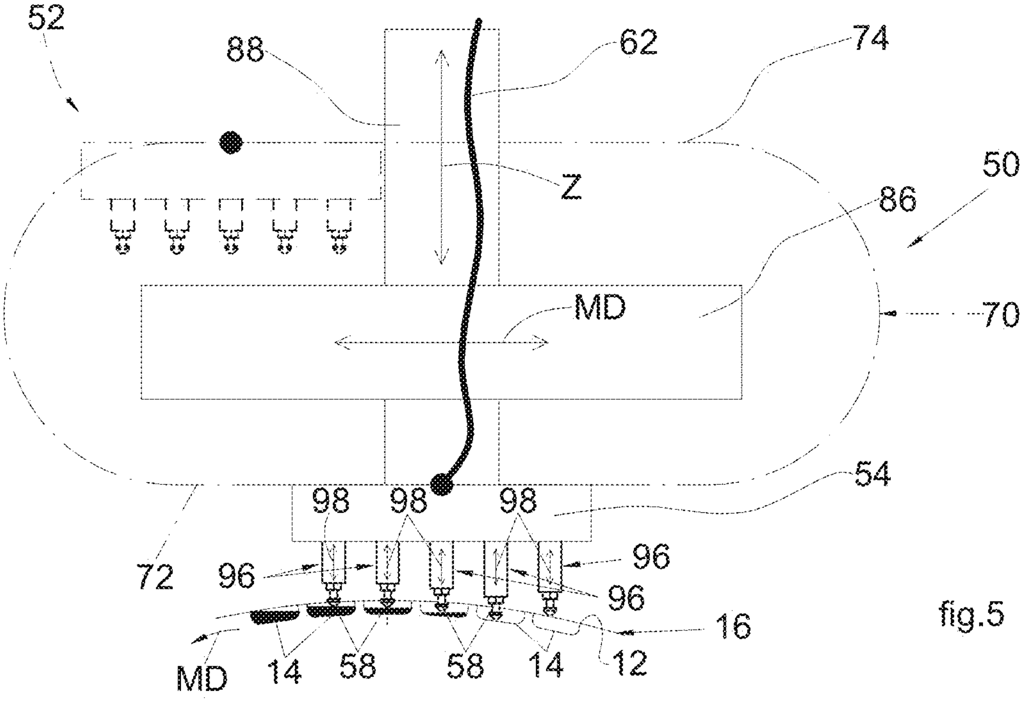

With reference to FIGS. 4 and 5, in a possible embodiment each of the movement control units 66, 68 comprises a first linear guide 86 extending along the machine direction MD and a second linear guide 88 extending along a vertical direction Z. The second linear guide 88 is movable along the first linear guide 86 in the machine direction MD. The second linear guide 88 is also movable in the vertical direction Z with respect to the first linear guide 86. A lower end of the second linear guide 88 is connected to the respective nozzle support body 54. The movement of each nozzle support body 54, 56 may be controlled by a respective closed-loop belt 87 wound on two pulleys 89, one of which is driven by a motor 90.

With reference to FIG. 5, in a possible embodiment each nozzle support body 54, 56 may carry a plurality of transverse nozzle rows 96 and a plurality of actuators 98 arranged between each transverse nozzle row 96 and the nozzle support body 54. The actuators 98 control the vertical position Z of the respective transverse nozzle rows 96 with respect to the nozzle support body 54. The transverse nozzle rows 96 may move in the vertical direction independently of each other. This embodiment is useful in particular when the forming surface 12 is cylindrical. In fact, if the vertical position of the nozzles 58, 60 were constant, the distance between the fluid delivery apertures of the nozzles 58, 60 and the walls of the cavities 14 would vary during the movement of the nozzles 58, 60 in the machine direction MD. The possibility of adjusting independently the vertical position of each transverse nozzle row 96 allows to maintain constant the distance between the fluid delivery apertures of the nozzles 58, 60 and the level of fluid contained in the cavities 14 during the movement of the nozzles 58, 60 in the machine direction MD.

Figure 6:
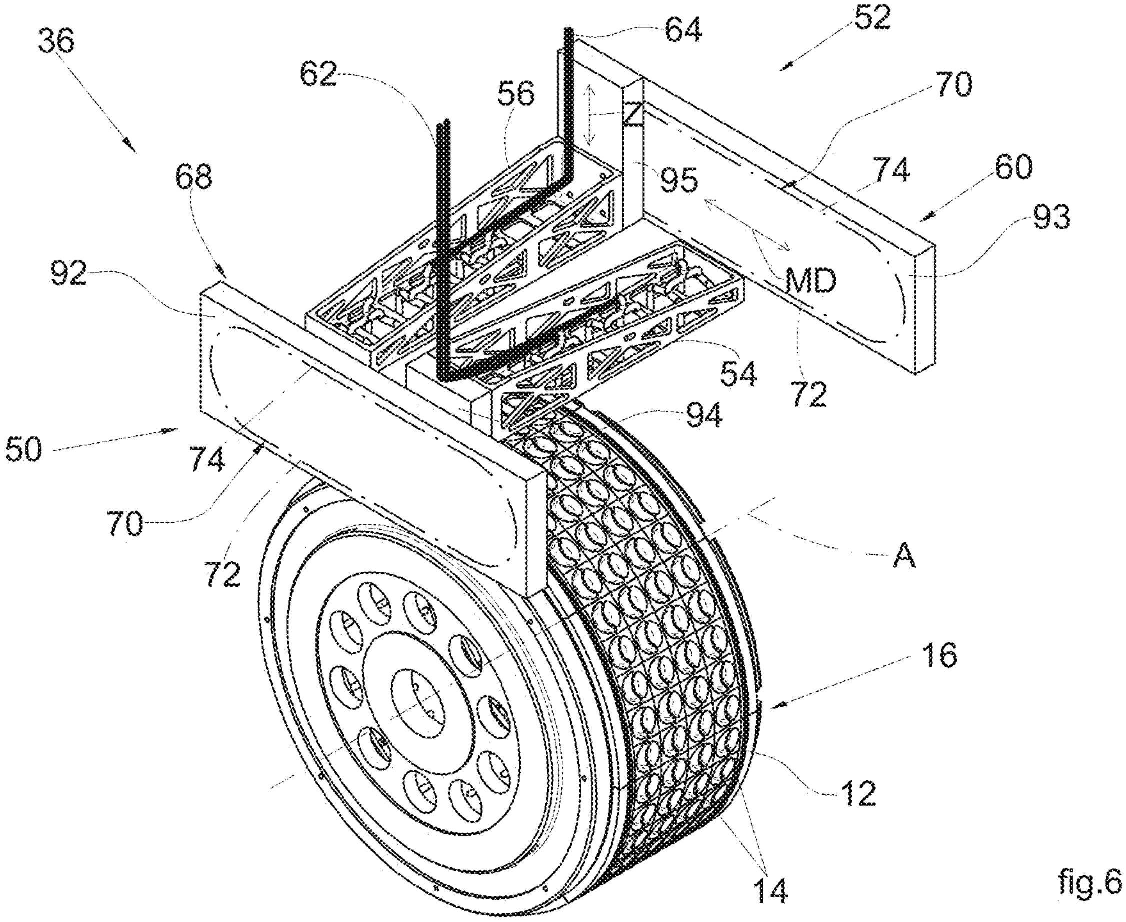
FIG. 6 is a perspective view of a third embodiment of a dosing apparatus of the machine according to the present invention.

With reference to FIG. 6, in a possible embodiment the movement control units 66, 68 comprise respective stationary guides 92, 93 extending along the closed-loop path 70 and respective movable elements 94, 95 movable along the respective stationary guides 92 along the closed-loop path 70 and connected to respective nozzle support bodies 54, 56. Each stationary guide 92, 93 and the associated movable element 94, 95 may be, respectively, the stator and the mover of a linear motor. The movable elements 94, 95 may be adjustable in the vertical direction Z to adjust the vertical position of the nozzles 58, 60.

FIGS. 7-10 schematically show the operation of the dosing apparatus 36.

Figure 7:
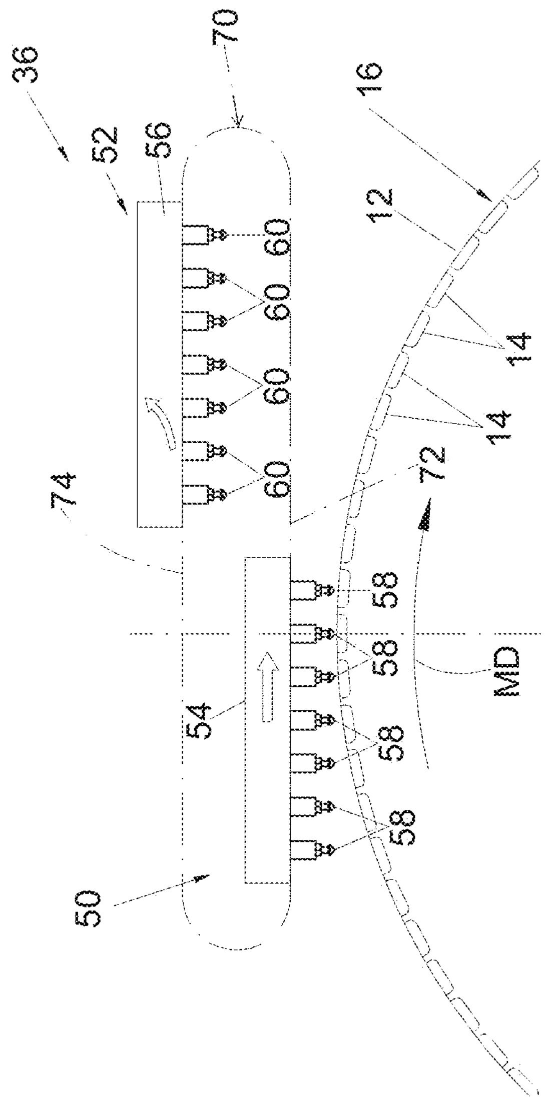
FIGS. 7-12 are schematic views showing the operations of the machine according to the present invention.
Figure 8:
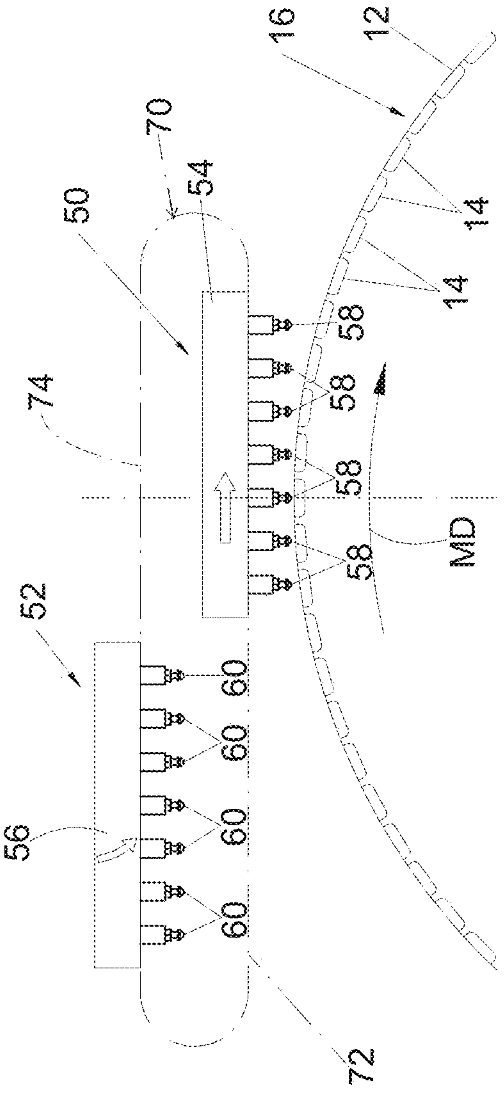

As shown in FIGS. 7 and 8, while the first nozzle support body 54 moves in the machine direction MD along the lower delivery section 72 of the closed-loop path 70 the second nozzle support body 56 moves in a direction opposite to the machine direction MD along the upper return section 74 of the closed-loop path 70. During the travel along the lower delivery section 72, the nozzles 58 of the first nozzle support body 54 fill the respective recesses of the first continuous water-soluble film 20, placed at the respective cavities 14.

Figure 9:
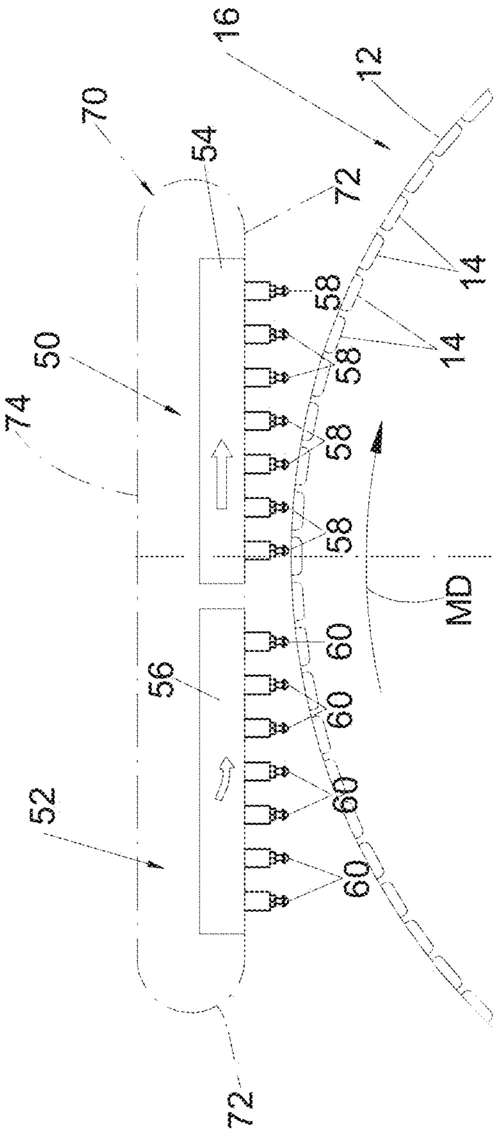

As shown in FIG. 9, when the first nozzle support body 54 is reaching the end of the lower delivery section 72, the second nozzle support body 56 starts moving in the machine direction MD along the lower delivery section 72 and fills a new set of recesses.

Figure 10:
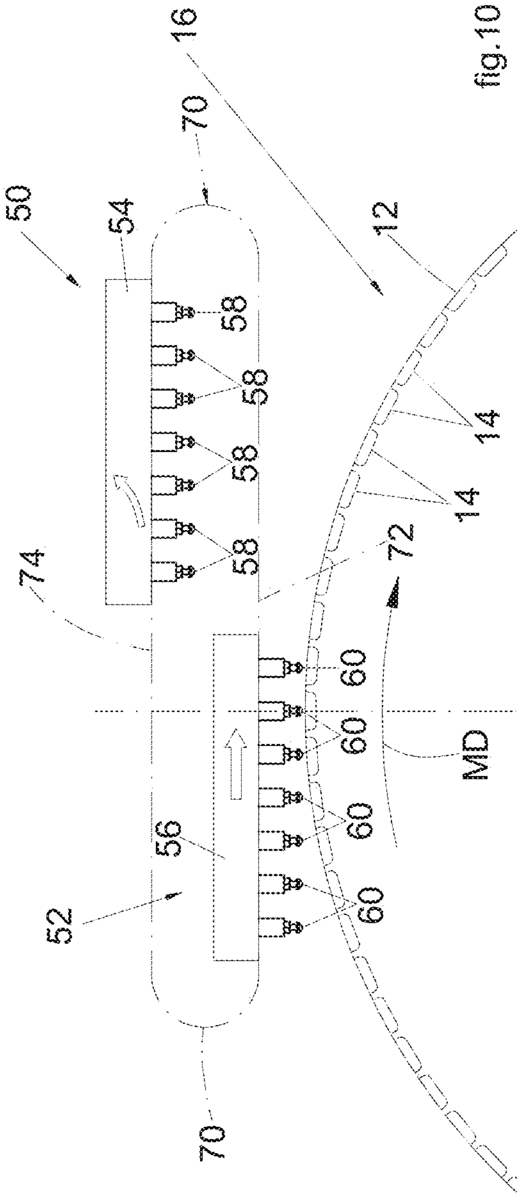

Then, as shown in FIG. 10, as the first nozzle support body 54 moves in a direction opposite to the machine direction MD along the upper return section 74 the second nozzle support body 56 moves in the machine direction MD along the lower delivery section 72 of the closed-loop path 70. Therefore, at any moment the nozzles 58, 60 of at least one of the two nozzle support bodies 54, 56 are operative for delivering fluid, which greatly improves speed and efficiency of the machine.

The movement of the nozzle support bodies 54, 56 along a closed-loop path 70 having a lower delivery section 72 and an upper return section 74 is effective for solving the problem of splashing in that the cyclical movement between a raised position and a lowered position allows the fluid delivery apertures of the nozzles 58, 60 to be positioned at a reduced distance from the walls of the cavities 14.

Figure 11:
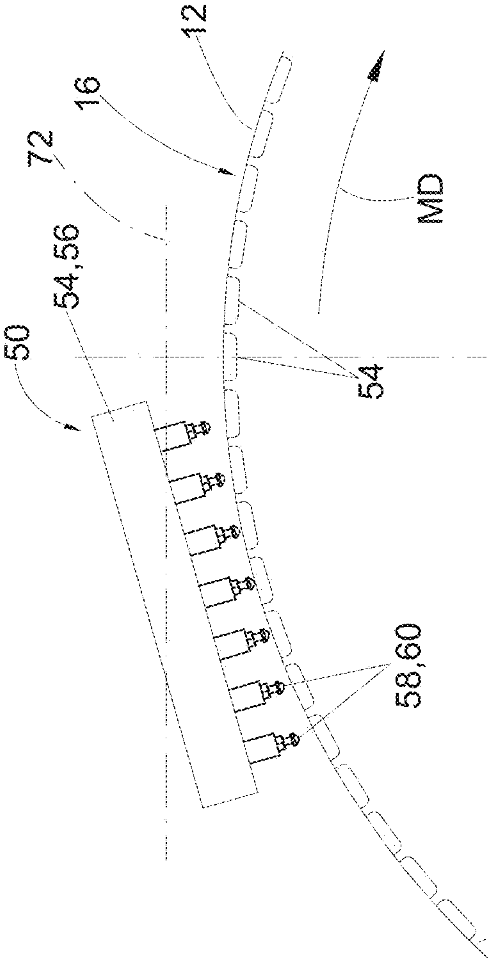
Figure 12:
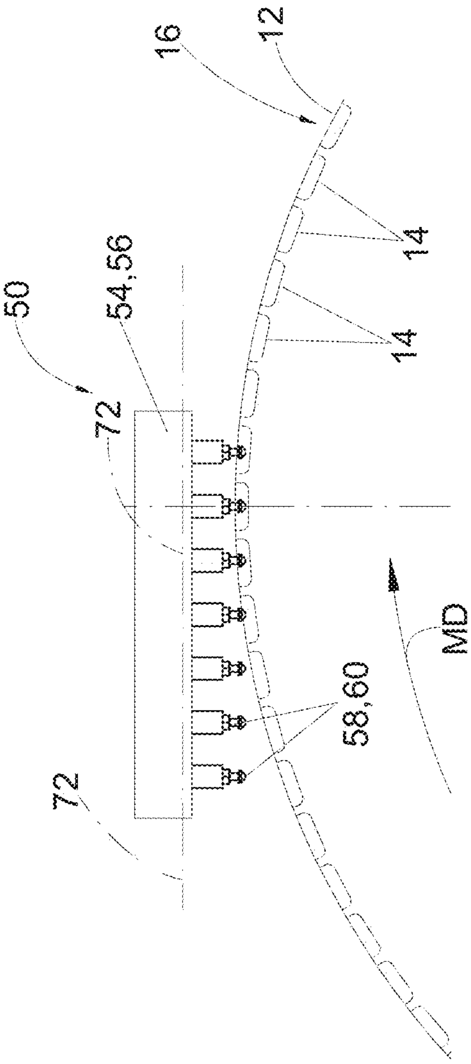

With reference to FIG. 11, the movement control units 66, 68 may be configured to control the angular position of the respective nozzle support bodies 54, 56 about a horizontal transverse axis during the movement of the respective nozzle support body 54, 56 along the lower delivery section 72 of the closed-loop path 70. The inclination of the nozzle support bodies 54, 56 about a horizontal transverse axis allows the nozzle support bodies 54, 56 to be oriented tangential to the forming surface 12 during the whole movement along the lower delivery section 72 of the closed-loop path 70.

In a possible embodiment, each of the nozzle support bodies 54, 56 may have a lower surface having the same curvature as that of the cylindrical forming surface 12 of the drum 16. The movement control units 66, 68 are controlled so as to keep the nozzles 58, 60 orthogonal to the respective cavities during the movement of the nozzle support bodies 54, 56 along the lower delivery section 72 of the closed-loop path 70.

With reference to FIG. 11, the movement control units 66, 68 may be configured to insert the fluid delivering apertures of the nozzles 58, 60 into respective cavities 14 during the movement of the nozzle support bodies 54, 56 along the lower delivery section 72 of the closed-loop path 70, so as to reduce the distance between the fluid delivery apertures of the nozzles 58, 60 and the walls of the cavities 14 during the dispensing step. This feature, which is particularly effective in eliminating splashing, would not be possible in prior art solutions in which the nozzles are reciprocated along a straight horizontal direction.

Of course, without prejudice to the principle of the invention, the details of construction and the embodiments can be widely varied with respect to those described and illustrated, without thereby departing from the scope of the invention as defined by the claims that follow.

The invention claimed is:

1. A dosing apparatus for a machine for producing unit dose articles using a cylindrical forming surface, including first and second dosing units each comprising:

a nozzle support body, a plurality of nozzles having respective fluid delivery apertures, carried by said nozzle support body and connected to a fluid delivery system via at least one flexible tube, and a movement control unit configured for moving the respective nozzle support body along a closed-loop path that forms a continuous loop having a lower delivery section configured to move in a machine direction of the machine and an upper return section that is spaced apart from the lower delivery section and configured to move in a direction parallel to and opposite the machine direction of the machine, wherein the movement control units of the first and second dosing units are configured for moving the respective nozzle support bodies independently of each other along said closed-loop path.

2. The dosing apparatus of claim 1, wherein each movement control unit is configured for adjusting a position in a vertical direction which the fluid delivery apertures of the respective plurality of nozzles have during movement of said nozzle support bodies along said lower delivery section of said closed-loop path.

3. The dosing apparatus of claim 1, wherein each nozzle support body carries a plurality of transverse nozzle rows and a plurality of actuators arranged to control a vertical position of each transverse nozzle row with respect to the respective nozzle support body.

4. The dosing apparatus of claim 1, wherein each movement control unit comprises a robotic arm having a terminal element connected to the respective nozzle support body and movable in at least two orthogonal directions.

5. The dosing apparatus of claim 1, wherein each movement control unit comprises a first linear guide extending along a first direction, and a second linear guide extending along a second direction orthogonal to said first direction and movable with respect to said first linear guide along said first direction and along said second direction, wherein a lower end of said second linear guide is connected to the respective nozzle support body.

6. The dosing apparatus of claim 1, wherein each movement control unit comprises a stationary guide extending along said closed-loop path and a movable element movable along said stationary guide and connected to the respective nozzle support body.

7. A machine for producing unit dose articles, comprising:

a forming surface having a plurality of cavities, continuously movable in a machine direction, wherein said forming surface has a cylindrical outer surface, a first feeding assembly configured for feeding a first continuous water-soluble film on said forming surface at a first position, a retaining system configured for retaining said first continuous water-soluble film adherent to said cavities as it moves in said machine direction, a dosing apparatus according to claim 1, located downstream of said first position and configured for dispensing dosed quantities of at least one fluid composition into said cavities, a second feeding assembly configured for feeding a second continuous water-soluble film on said forming surface at a second position located downstream of said dosing unit so as to enclose said dosed quantities of at least one fluid composition between said first and second continuous water-soluble films, and a wetting unit configured for wetting a surface of said second continuous water-soluble film upstream of said second position.

8. The machine of claim 7, wherein said forming surface is a cylindrical outer surface of a drum rotating about a horizontal axis.

9. A method for producing unit dose articles, comprising:

providing a cylindrical forming surface having a plurality of cavities, continuously movable in a machine direction, feeding a first continuous water-soluble film on said forming surface at a first position, retaining said first continuous water-soluble film on said forming surface as said forming surface moves in said machine direction and forming in said first continuous water-soluble film a plurality of recesses by keeping the first continuous water-soluble film adherent to said cavities, providing a first nozzle support body and a second nozzle support body carrying respective nozzles having respective fluid delivering apertures and connected to a fluid delivery system via respective flexible tubes, continuously moving said first and second nozzle support bodies independently of each other along a closed-loop path having a lower delivery section configured to move in the machine direction and an upper return section that is spaced apart from the lower delivery section and configured to move in a direction parallel to and opposite the machine direction, delivering dosed quantities of fluid products into said recesses through said respective nozzles during movement of said first and second nozzle support bodies along said lower delivery section of said closed-loop path, and applying a second continuous water-soluble film on said first water-soluble film and connecting to each other said first and second water-soluble films by water-sealing around said plurality of recesses so as to enclose said dosed quantities of fluid composition between said first and second continuous water-soluble films.

10. The method of claim 9, comprising moving one of said first and second nozzle support bodies in said machine direction along the lower delivery section of the closed-loop path while moving the other of said first and second nozzle support bodies in a direction opposite said machine direction along the upper return section of the closed-loop path.

11. The method of claim 9, comprising inserting the fluid delivering apertures of said respective nozzles into respective recesses during the movement of said first and second nozzle support bodies along said lower delivery section of said closed-loop path.

12. The method of claim 9, comprising adjusting a position in a vertical direction which said fluid delivery apertures have during the movement of said first and second nozzle support bodies along said lower delivery section of said closed-loop path.

* * * * *